United States Patent
Bibyk

(12) 
(10) Patent No.: US 6,202,198 B1
(45) Date of Patent: Mar. 13, 2001

(54) PROGRAMMABLE INTEGRATED ANALOG INPUT/OUTPUT CIRCUIT WITH DISTRIBUTED MATCHING MEMORY ARRAY

(75) Inventor: Steven B. Bibyk, Columbus, OH (US)

(73) Assignee: Neoprobe Corporation, Dublin, OH (US)

( * ) Notice: Subject to any disclaimer, the term of this patent is extended or adjusted under 35 U.S.C. 154(b) by 0 days.

(21) Appl. No.: 09/063,915

(22) Filed: Apr. 21, 1998

(51) Int. Cl.[7] ...................................................... G06F 17/50
(52) U.S. Cl. .................................. 716/17; 716/1; 341/61; 341/143
(58) Field of Search ........................... 716/17, 1; 341/61, 341/143, 50, 123, 155

(56) References Cited

U.S. PATENT DOCUMENTS

| | | | |
|---|---|---|---|
| 5,134,401 | 7/1992 | McCartney et al. ................. | 341/143 |
| 5,155,743 | 10/1992 | Jacobs .................................. | 375/247 |
| 5,412,368 | * 5/1995 | Gammack et al. ............... | 340/146.2 |
| 5,446,917 | 8/1995 | Krisciunas et al. .................... | 710/69 |
| 5,457,456 | 10/1995 | Norsworthy ........................... | 341/61 |
| 5,463,569 | 10/1995 | Staver et al. ......................... | 708/313 |
| 5,578,962 | * 11/1996 | Rastegar .................................. | 330/9 |
| 5,768,478 | * 6/1998 | Batten, Jr. .............................. | 706/43 |
| 5,784,631 | * 7/1998 | Wise ..................................... | 382/246 |
| 5,917,552 | * 6/1999 | Van Court ............................. | 348/558 |
| 6,009,082 | * 12/1999 | Caswell et al. ....................... | 370/276 |
| 6,088,785 | * 7/2000 | Hudson et al. ........................ | 712/35 |

OTHER PUBLICATIONS

Ericson et al. "A Flexible Analog Memory Address List Manager For Phenix," IEEE, pp. 5–9, 1996.*

Nicollini et al. "A High–Performance Analog Front–End 13–Bit Linear Codec For 3V Digital Cellular Phones," IEEE, pp. 297–300, 1995.*

Batruni et al. "Mixed Digital/Analog Signal Porcessing For A Single–Chip 2B1Q U–Interface Transceiver," IEEE, pp. 1414–1425, 1990.*

Lee et al. "High–Throughput Data Compressor Design Using Content Addressable Memory," IEEE, pp. 69–73, Feb. 1995.*

Dijkstra et al., "Wave Digital Decimation Filters In Oversampling A/D Converters," IEEE, pp. 2327–2330, 1988.*

Yang et al. "High–Throughput Data Compressor Designs Using Content Addressable Memory," IEEE, pp. 147–150, May 30, 1994.*

EDN Focus Seriesfrom EDN Magazine. Jan. 16, 1997, One page.

PIC16C7X from Microchip Technology, Inc. Dated 1997. One page catalog.

CS4215 by Crystal Semiconductor Corporation. Oct. 1994 one page catalog. No Date.

EPAC by IMP, Inc. catalog No Date.

(List continued on next page.)

Primary Examiner—Paul R. Lintz
Assistant Examiner—Vuthe Siek
(74) Attorney, Agent, or Firm—Mueller and Smith, LPA

(57) ABSTRACT

A program controlled integrated circuit having an input path for receiving an analog signal with given attributes and using a program controlled sequence of treatment stages to generate a bit-defined information vector. That vector is introduced to a distributed memory matching array where it is compared with conveyed instruction set having bit-defned codewords corresponding with an analog signal attribute. A match process under the control of a central control unit then develops a digital result. The digital result may be utilized or converted to analog form in an analog return path. Both the input path and the return path incorporate a reduced instruction set computing arithmetic unit under the control of the central control unit.

42 Claims, 10 Drawing Sheets

OTHER PUBLICATIONS

16–Bit Sigma–Delta AIC by Texas Instrument Dated 1996.

Introducing Motorola's Field Programmable Analog Array is published by Motorola. It is an applications note dated 1997.

Press Releases by Motorola dated May 8, 1997.

Article entitled Analog Chips Enter Programmable Fray is dated May 19, 1997 in Electronic Engineering Times.

Article entitled MPAA Frequently Asked Questions is a web site download dated Feb. 25, 1998.

EPAC IMP50E30 is a data sheet by IMP, Inc. dated Apr. 1996.

Advertising literature entitled EPAC dated Jan. 1995. p. 1–7.

IMP50E10 Data Sheet is a web site download. No Date.

Publication "The Practical Engineer" is a reprint from IEEE Spectrum, vol. 34, No. 10, dated Oct. 1997.

MCA Technologies, Inc. data sheed. p. 1–8, No Date.

Publication TRACO20 is a data sheet by Zetex dated Nov. & Dec. 1996. p. 1–8.

Preliminary Information ISS2095 is a data sheed dated Apr. 21, 1995 by Integrated Sensor Solutions, Inc. p. 1–7.

EPAD Micropower Operational Amplifier by Advanced Linear Devices, Inc. is dated 1997 and is a data sheet. p. 1–10.

* cited by examiner

PROGRAMMABLE INTEGRATED ANALOG INPUT/OUTPUT CIRCUIT WITH DISTRIBUTED MATCHING MEMORY ARRAY

CROSS-REFERENCE TO RELATED APPLICATIONS

None.

STATEMENT REGARDING FEDERALLY SPONSORED RESEARCH

Not applicable.

BACKGROUND OF THE INVENTION

Over the past several decades the technology of electronics has evolved from the vacuum tube to the discretely employed transistor and then to the integrated circuit (IC). The latter integrated circuits are generally referred to as "chips". Integrated circuit technology has advanced to custom circuit integration or microelectronics involving a science generally referred to as "very large scale integration" (VLSI). This technological evolution, for the most part has occurred in the domain or world of digital microelectronics, as opposed to the analog world of electronics. Technological evolution in the digital world has generated very high component densities in silicon, providing circuits evidencing not only improved operational capabilities, but also advantageously providing lower costs for the functions achieved. In effect, the components of the digital circuit have been scaleable to smaller and smaller levels to the extent that the power of digital processing has been observed essentially to double about every eighteen months. Digital circuits are readily programmable, an aspect of their nature which has greatly expanded the availability of digital electronics technology to a wide range of disciplines. Thus, the scientist or engineer trained in non-electronic disciplines may enjoy the capability of using high level programming language to apply digital electronics to non-electronic technologies.

The analog world of electronics has not grown nor developed apace, even though commentators have observed that it is an analog world that we live in. For example, the following commentary has been made:

However since we live in an analog world, we cannot avoid processing analog signals and in many cases it is more natural to use analog, rather than digital signal processing.

S. Sakurai and M. Ismail. "Low-Voltage CMOS Operational Amplifiers: Theory, Design, and Implementation". 1995, Kluwer Academic Publishers.

Typical analog electronics involve the sensing of or reaction to some physical phenomena in the generation of a corresponding electrical signal. Conversely, analog electronics may respond to some form of electronic command signal to drive an actuator, typically resulting in some form of physical result such as the motion of a motor or loudspeaker. These tasks require the use of amplifiers such as the ubiquitous operational amplifier, filters, buffers, comparators and the like. The design of such analog circuits usually requires an analog specialist; is time consuming and costly. Components forming analog circuits such as capacitors and resistors are not uniformly precise, thus tuning, noise rejection and like affectations generally will hinder the progress of circuit development. Re-design efforts in perfecting circuits are not uncommon. A programmability of analog circuits would be most beneficial, such that the designer can quickly and efficiently alter the circuits as the physical phenomena with which they perform is more understood. To the present, however, this type feature has only been available to the extent of switching components such as capacitors or resistors in and out of the analog circuits, for example, to adjust gain. Because the number of such components is finite, the adjustments achieved necessarily are gross without the availability of vernier tuning.

Very often, the analog circuits are combined with digital circuits, i.e., in integrated circuits referred to "mixed mode" devices. The interface between analog and digital regimes is through analog to digital (A/D) or digital to analog (D/A) converters. Most commonly, these devices perform with multi-bit parallel words, i.e., sixteen, thirty-two or sixty-four bit word systems, the multiple lines of which consume a substantial area of silicon on a chip. There are, however, several methods of analog to digital or digital to analog conversion, i.e., Sigma Delta converters which, for example, combine oversampling with decimation filtering in an input analog to digital configuration. The bit stream outputs of those input features then are combined with mu and A-law encoder functions the development of which has been based upon what amounts to decades of investigation into specific areas of use, i.e., speech, and video systems. These integrated circuits conventionally are referred to as codecs. Their output from digital to analog performance typically utilizes an expanding interpolation filter, a Sigma Delta digital to analog converter and filtering. For the present, codecs are application specific.

A more common combination of analog and digital circuitry is through the utilization of both analog to digital and digital to analog converters in conjunction with a digital signal processor (DSP). The DSP is a rather large integrated circuit requiring the utilization of a microcontroller and programming with a complexity again requiring the services of an electronic specialist. Generally, their circuits will not be contained in a single chip and their programmability is limited to the digital (DSP) regime. Of course, cost in labor and manufacture follows complexity in the world of analog and digital combinations.

An integrated circuit having the ability to fine tune analog input paths and output paths which is programmable, using universally understood high level programming language would be well received in the technical community. Such a circuit would permit scientists and engineers within a wide variety of disciplines other than digital or analog electronics to develop systems and products with relative facility and would hold promise to promote the development of new products and systems.

BRIEF SUMMARY OF THE INVENTION

The present invention is addressed to a programmable integrated circuit or chip for converting analog signals to digital form and for generating a responding analog signal at an output. Control over essentially all treatment and conversion stages is developed from an on-chip central control unit. That central control unit participates in programming functions through an interface port. Programming of the device is made available to a substantially broadened sphere of users, including systems technologists, with little knowledge of analog circuit design by being made available in high level programming language.

Enhanced program control over the analog input path of the chip is developed by combining a program controlled gain stage, a program controlled oversampling coder, a program controlled decimating filter, and a program controlled reduced instruction set computing arithmetic unit to evolve a bit-defined information vector. That vector then is introduced to a distributed memory matching array (DMMA) which carries out a matching sequence with a program conveyed instruction set of bit-defined codewords. Upon electing an optimum match or matches with certain of these codewords, a digital result is achieved. That digital result may be conveyed from the chip through the interface port or may be utilized in a programmed and controlled analog return path. The DMMA architecture is ideally suited for current LSI technology to permit facile fabrication of this substantially universally employable peripheral device.

In the analog return path of the chip, the digital result is expanded through utilization of a program controlled oversampling decoder. A resultant expanded digital word sample result then is directed to a program controlled interpolating filter stage which provides a digital-word defining signal having interpolated sample data values at supplemental inter-word positions. The digital word then is converted to analog signal form and submitted to an output interface stage for delivery of the ultimate analog output signal which provides a response to the evaluation of programmed attributes of the analog input signal. As in the case of the analog input path, the digital word-defining signal having interpolated sample data values at supplemental inter-word positions may be treated by a program controlled reduced instruction set arithmetic unit.

As another feature, the invention provides an integrated circuit for receiving and treating an analog signal exhibiting given signal attributes and for communicating with an external control component. The circuit includes a conditioning stage connectable to receive the analog signal to provide a conditioned analog signal. That signal is introduced to an oversampling coder stage which responds to an oversampling control to provide a corresponding coded serial bit stream output. A decimating filter stage responds to a decimating filter control and to the coded serial bit stream output to provide an output with a bit-defined information vector having a data aspect corresponding with the given signal attributes. An interface port is provided having a coupling portion connectable for communication with the external control component and having an internal portion. Programming and data memory are provided including a distributed memory matching array responsive to a conveyed instructions set having bit-defined codewords corresponding with a selected signal attribute. The distributed memory matching array responds to a match control input to identify a correspondence between the information vector and at least one of the codewords to provide a digital result. An output network is provided which is responsive to that digital result to derive an output signal. The circuit further includes a central control unit coupled in data exchange relationship with the interface port internal portion and the programming and data memory and which is responsive to derive the oversampling control, the decimating filter control and the match control input and effects conveyance of the instruction set to the distributed memory matching array.

Another feature of the invention provides an integrated circuit for receiving and treating an analog signal exhibiting given signal attributes and for communicating with external control component. The circuit includes an input network connectable to receive the analog signal to provide a network output with a bit-defined information vector having a data aspect corresponding with at least one of the given signal attributes. An interface port is provided having a coupling portion connectable for communication with the external control component and further having an internal portion. A programming and data memory is provided including a distributed memory matching array responsive to a conveyed instruction set having bit-defined codewords corresponding with a select signal attribute. The distributed memory matching array is responsive to a match control input to identify a correspondence between the information vector and a codeword to provide a digital result. The circuit further includes an oversampling decoder stage which responds to a decoded control and to the digital result to provide an expanded digital word sample result with supplemented inter-word positions. An interpolating filter stage responds to an interpolator control and to that expanded digital word sample result to provide an interpolator output which in turn provides a digital word defining signal having interpolated sample data values at the supplemental inter-word positions. An analog signal formation stage responds to the interpolator output to provide a corresponding analog output signal. That output signal is introduced to an output interface stage which provides a treated analog output. A central control unit is formed with the circuit which is coupled in data exchange relationship with the interface port internal portion and the programming and data memory and is responsive to provide the decoder control and the interpolator control.

Other objects of the invention will, in part, be obvious and will, in part, appear hereinafter. The invention, accordingly, comprises the apparatus and method possessing the construction, combination of elements, arrangement of parts, and steps which are exemplified in the following description.

For a fuller understanding of the nature and objects of the invention, reference should be had to the following detailed description taken in connection with the accompanying drawings.

DETAILED DESCRIPTION OF THE INVENTION

Figure 1:
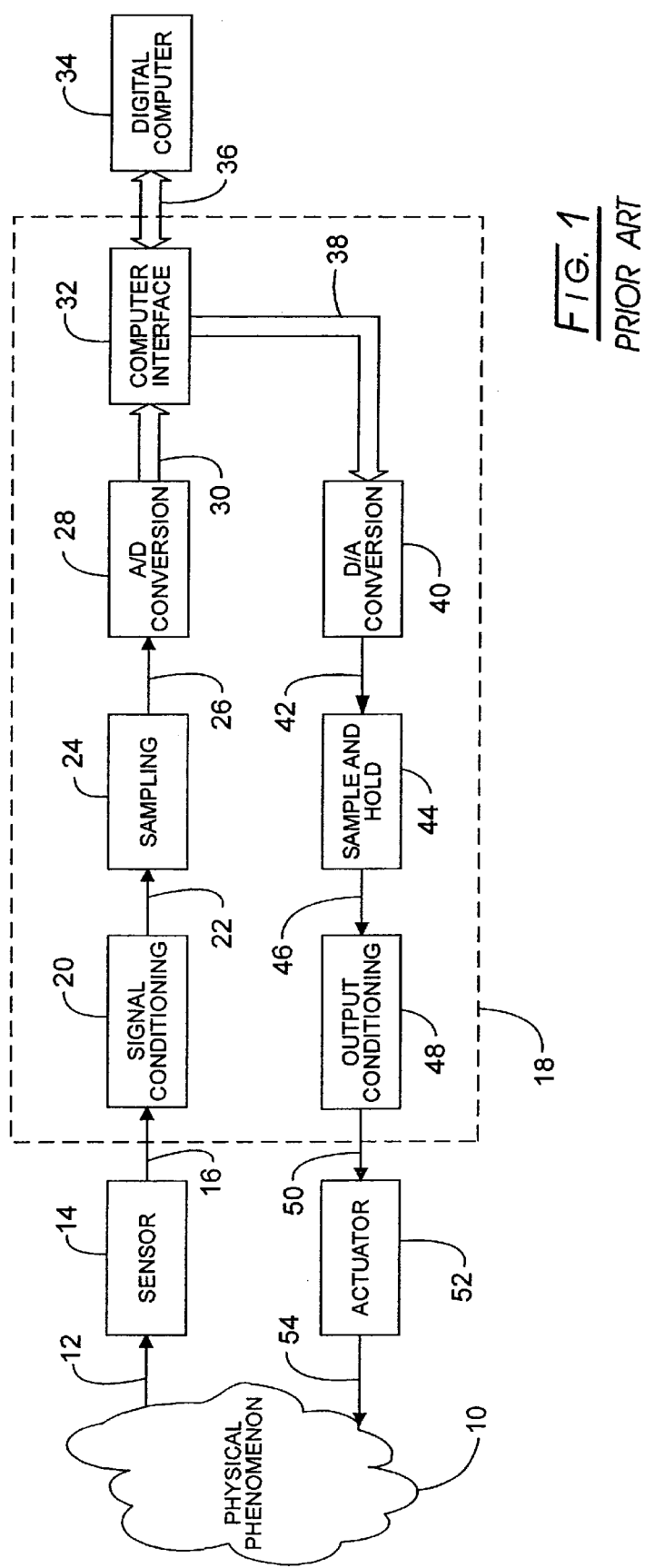
FIG. 1 is a block schematic diagram showing a conventional analog sensing system with conversion to digital format, treated by digital computer and returned to an analog output for carrying out some form of actuator activity.

Referring to FIG. 1, the task specifically carried out by an analog circuit or circuits when performing with a host digital computer are diagrammed. In the figure, a physical phenomenon which is sensed and then acted upon is represented at 10. Certain attributes of this phenomenon 10 are sensed as represented by arrow 12 at a sensor represented at block 14. The sensor 14 will develop some form of a corresponding sensor output as represented by arrow 16 which, in effect, represents an analog in signal. The analog in signal 16 typically will be braced with a variety of phenomena including spurious noise and unwanted sensed components as it enters a peripheral analog interface circuit represented within the dash boundary 18. First to be encountered within the boundary 18 is a signal conditioning function represented at block 20. The function 20 generally includes some form of amplification with a designed gain structure as well as a variety of filters which may be specific to the vagaries of sensor 14 and protective with respect to ambient phenomena. Following signal conditioning, the sensed signal may be sampled as represented at arrow 22 and block 24. Samples of the signal representing the attribute sought to be evaluated then may be converted to digital values as represented at arrow 26 and analog-to-digital conversion block 28. As represented at bus 30 a digital word now is produced, for example, from 8 to 64 bits in parallel width which is introduced to a computer interface or IO port represented at block 32. From the interface 32, the digital data is conveyed to a digital computer or host computer 34, as represented by the interactive bus arrow 36. In using its processing power, the computer 34 will evolve instructions, specifically in the form of digital words which are directed back to the interface 32. Interface 32, in turn, sends this digital data back to the analog realm 18 as represented by the bus arrow 38. As the digital data enters the analog regime, it is converted to analog form by digital-to-analog converter represented at block 40. The thus returning analog signal is represented at arrow 42 and, typically is directed to a Sample and Hold function as represented at block 44. The Sample and Hold function 44 serves to avoid analog value fluctuation as it progresses through the peripheral system and is introduced to output conditioning. In the latter regard, arrow 46 represents the input relationship between the Sample and Hold function 44 and an output conditioning function represented at block 48. Output conditioning as represented at block 48 typically involves buffering, drivers and the like which function in conditioning the analog output, now represented at arrow 50, to correspond with the requirements of some actuator function represented at block 52. Actuator 52 generally will carry out some physical activity with respect to the phenomenon 10 as represented at arrow 54.

Figure 2:
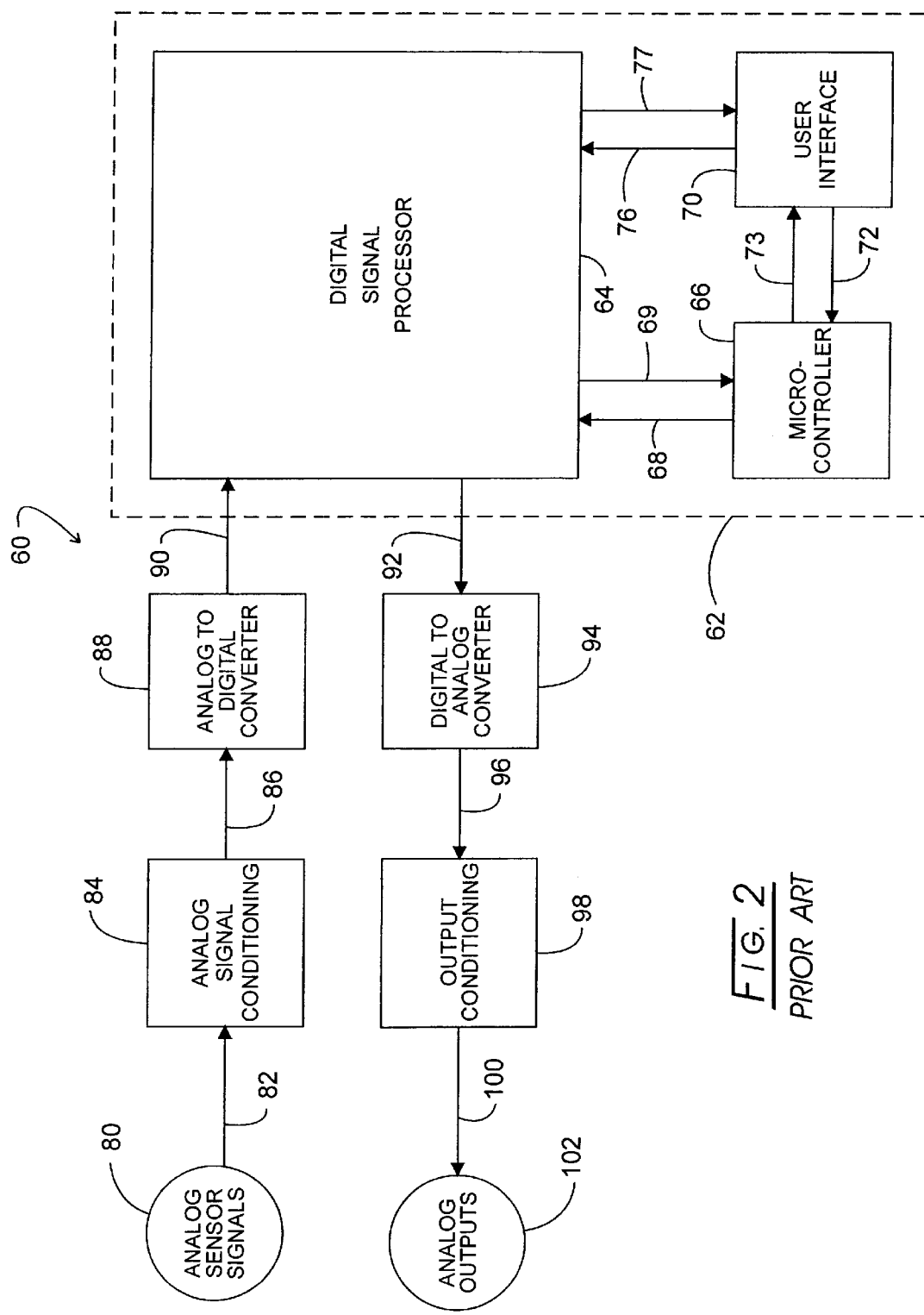
FIG. 2 is a schematic block diagram of prior art analog sensing, conversion to digital format, treatment by a DSP and return development of an analog output.

Referring to FIG. 2, a typical solution for more complex digital signal processes in a combined analog/digital system is represented generally at 60. The programmable components of circuit 60 are in the digital realm and are located within the dashed boundary 62. These components include a digital signal processor (DSP) 64. DSP 64 is under the control of a microcontroller 66 as represented by the interactive arrows 68 and 69. Typically, some form of user interface including a display is provided to afford some approach for entering commands. Such an interface is represented at 70. Interaction of the interface 70 with microcontroller 66 is represented by arrows 72 and 73, while corresponding interaction with the DSP 64 is represented at arrows 76 and 77.

Typically, all programming for circuits as at 60 is present within the boundary 62 and the analog aspects of such circuits have no programmability of significance. Looking to the analog side of the circuit 60, analog sensor signals are represented at symbol 80. These signals 80 are directed as represented by arrow 82 to an analog signal conditioning function 84. As before, this analog signal conditioning typically will include a gain stage, filtering and the like. The thus treated sensor signals then are directed as represented by arrow 86 and block 88 to a digital conversion function which typically is implemented with an analog-to-digital converter (A/D). The now digitized signal is introduced to DSP 64 as represented at arrow 90. Desired attributes of the thus digitized signal then may be evaluated and a digitized command signal is generated and introduced from DSP 64 to conversion to analog form as represented by arrow 92 and block 94. The analog output then is conditioned as represented at arrow 96 and block 98 for purposes of developing the final analog output. For example, sample and hold devices as well as buffers, drivers, and the like may be employed for the function represented at block 98. The thus conditioned signal then is provided as an analog output as represented at arrow 100 and symbol 102. The subject matter of digital signal processing is addressed in the following publications:

A. Oppenheim and R. Schafer, *Digital Signal Processing*, Prentice-Hall (1975)

L. Rabiner and B. Gold, *Theory and Application of Digital Signal Processing*, Prentice Hall (1975).

A. Oppenheim (editor), *Applications of Digital Signal Processing*, Prentice-Hall, (1978).

Figure 3:
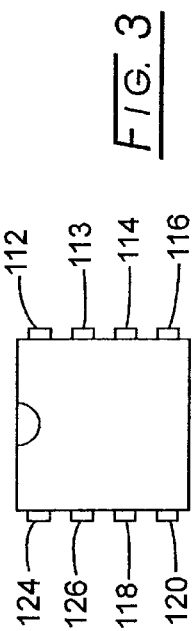
FIG. 3 is a schematic representation of the physical appearance of an integrated circuit board chip developed utilizing the circuit of the invention.

Looking to FIG. 3, a simple presentation of a chip which may contain the highly programmable mixed mode integrated circuit according to the invention is revealed generally at 110. The chip 110 will include an interface port here shown as manifested by three terminals 112–114. These terminals 112–114 basically will provide a data in function, a data out function and a clock input with a purpose of scheduling data transference. A ground terminal is provided at 116. At the opposite side, the circuit 110 includes a power input represented at terminal 118, as well as a clock input terminal 120. This clock input is utilized for the purpose of sampling. Finally, the chip 110 includes an analog in terminal at 122 and an analog out terminal at 124.

Figure 4:
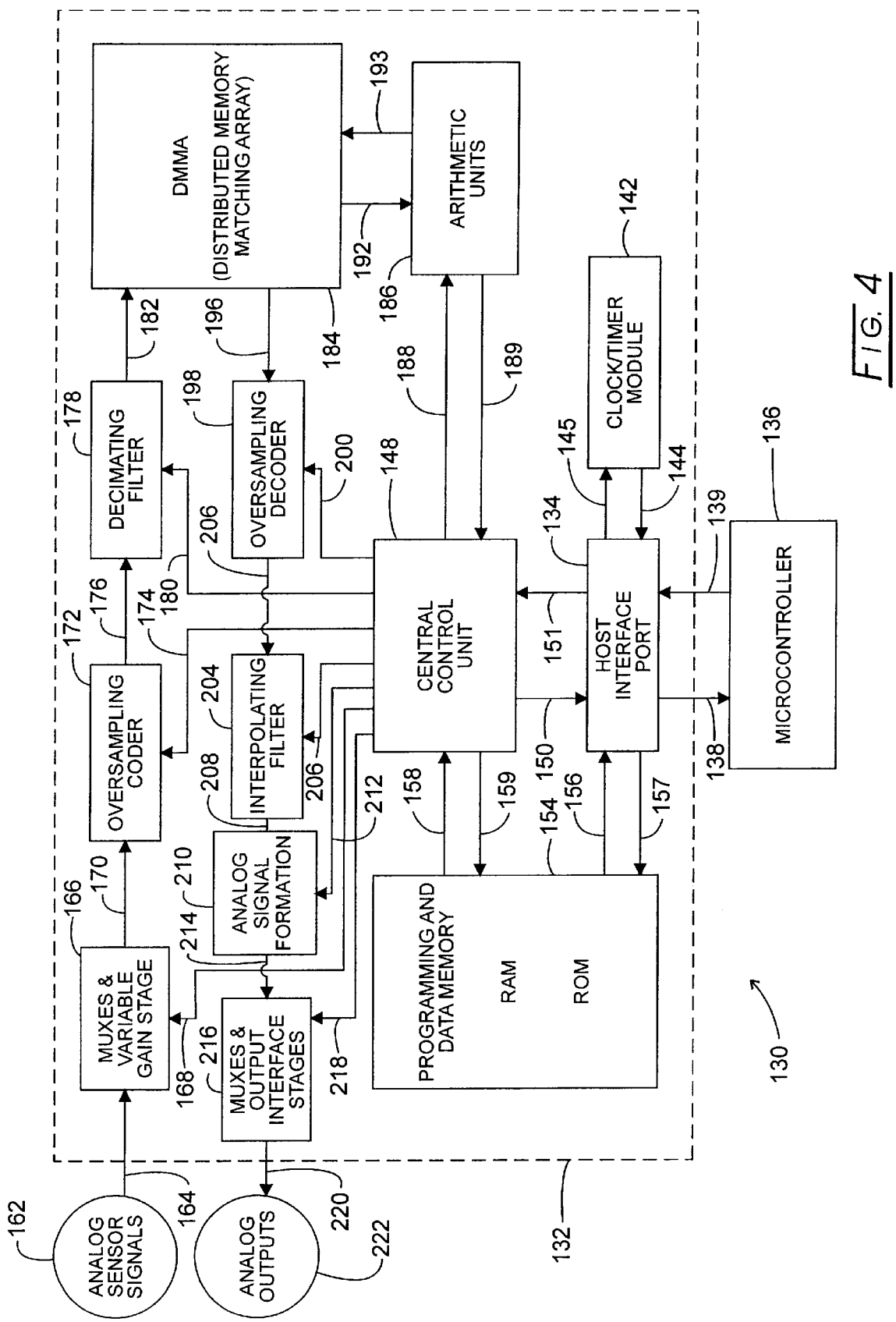
FIG. 4 is a block diagram of the overall integrated circuit of the invention.

Referring to FIG. 4, the overall architecture of the integrated circuit of the invention is revealed in block diagrammatic fashion and represented generally at 130. Those components of the circuit 130 which are integrated within a chip, for example, as discussed in connection with FIG. 3 are located within a dashed boundary 132. Circuit 130 is highly programmable and for this purpose includes an interface or host interface port represented at block 134. Port 134 is connectable for communication with an external central component such as a microcontroller such that the circuit 130 may be programmed for the application at hand. Accordingly, a microcontroller is shown at block 136 which may communicate with port 134, as represented by the interactive arrows 138 and 139. The chip or circuit 130 includes a clock/timer module represented at block 142. Module 142 preferably, receives a clock input, for example, as described in connection with terminal 120 in FIG. 3. The function 142 carries out appropriate dividing activities to derive an internal clock. Its association with the port 134 is represented by arrows 144 and 145. Port 134 also is seen providing communication with a central control unit 148 as represented by arrows 150 and 151. Control unit 148 somewhat resembles a conventional microprocessor, however it may be quite simplified, for example, as compared with microcontroller 136. The controller unit 148 is designed specifically to control essentially all of functions, of circuit 130, i.e., the circuit is highly programmable.

Host interface port 134 also communicates in data exchange relationship with programming and data memory represented at block 154. This interactive data exchange communication is represented at arrows 156 and 157. Memory function 154 also is seen to be under the control of the central control unit 148 as represented by arrows 158 and 159. The memory function will include random access memory (RAM) and read only memory (ROM).

Analog sensor signals are introduced to the circuit 130 as represented by symbol 162 and arrow 164. The function of the analog in terminal 124 is described in connection with FIG. 3. This analog signal at arrow 164 will exhibit certain given signal attributes which the user of circuit 130 will wish to identify and extract and thereafter utilize the result for developing an analog output.

Initially, the analog signal as represented at arrow 164 will be introduced to a multiplexing and variable gain stage. Such a gain stage is represented at block 166. This conditioning stage as represented at block 166 is under the control of a conditioning signal asserted from the central control unit 148 as represented at arrow 168. Such control provides for multiplexing and some gain switching. That switching may be somewhat gross in the nature described above, for example, providing for the selection of four reference voltages which are developed by selected switching of four resistors. With the control provided by the circuit 130, there is no special accuracy requirements for the resistors as long as they perform repeatedly. In particular, the control asserted will include calibration instructions which, for example, will apply a known voltage or zero offset to the input of circuit 130 to evolve an error signal which is stored in program memory. In many applications of the circuit 130 to analog sensors, it is also necessary to calibrate the sensor itself and the calibration of the stage 166 and the sensor can be carried out simultaneously. Further tuning or improvement of the quality of gain is accommodated for later in the analog input path.

The conditioned analog signal exiting conditioning stage 166 is directed, as represented by arrow 170 and block 172 to an oversampling coder stage. Stage 172 is the initial stage of a variation of a Sigma Delta system and is seen to be under the control of an oversampling control asserted from the central control unit 148, as represented at arrow 174. Oversampling coder 172 is implemented as an analog to pulse density device which generates a coded serial bitstream output represented at arrow 176. This one line serial bitstream is coded as a pulse density variation and is carried, as is evident, by one line. That arrangement reserves silicon die space. Control asserted from line 174 provides for programmed selection of the oversampling rate as well as the oversampling cycle, again providing programming flexibility to the user. In particular, the user will determine how many extra bits are to be employed and what forms those bits should represent, i.e., should they represent amplitude values, frequency values or other parameters. The resultant coded serial bit stream output is represented at arrow 176 as being introduced to the input of a decimating filter stage represented at block 178. Decimating filter 178 may be implemented as a programmable counter filter and performs under a decimating filter control represented at arrow 180 and asserted from the central control unit 148. With the exception that it is controlled from the central control unit, the decimating filter at stage 178 performs in conventional fashion, deriving an output with a bit-defined information vector. That vector will have a data aspect corresponding with the earlier determined signal attributes of the incoming analog signal at arrow 164. A decimation filter which is programmable by selected decimation factors is described, for example, in U.S. Pat. No. 5,457,456 by Norsworthy, entitled; "Data Converter With Programmable Decimation or Interpolation Factor, issued Oct. 10, 1995. See also U.S. Pat. No. 5,446,917 by Krisciunas et al, entitled "Programmable Length Decimation Filter As For Sigma-Delta Modulators", issued Aug. 29, 1995.

The decimating filter stage output is represented at arrow 182 and is shown being directed to a distributed memory matching array (DMMA) represented at block 184. DMMA 184 is an array of memory as opposed to a memory block standing alone. This technique represents a procedure for moving a computational operation into an association with memory such that memory resides or is interspersed with the computational process. The DMMA design readily is produced in a VLSI environment. It resembles a neural network, the latter being a single-or multi-layered-network of nodes (computational elements) and perhaps weighted lengths (arcs). These nodes are used for pattern matching and classification. The neural network achieves intelligent results through many minor parallel computations without employing rules or other logical structures. The term "array" as used with respect to the DMMA 184, reflects the dispersed computational aspect of the neural network. In the integrated circuit 130 memory is dispersed throughout the chip. Even though the programming and data memory is represented at a block 154, in effect, it sits throughout the circuit 130, some of it being in the oversampling devices of circuit 130. However control remains from the central control unit 148.

Where some requirement still exists for carrying out an arithmetic operation outside of the DMMA function represented at block 184, a minor arithmetic facility is provided to the circuit 130 with the implementation of arithmetic units which may be implemented instruction set computing units. This feature is represented at block 186 and is seen to be under the control of the central control unit 148 as represented by arrows 188 and 189. The arithmetic units represented at block 186 perform in conjunction with DMMA 184, as represented by arrows 192 and 193. In a specific implementation, the arithmetic units perform, for example, in conjunction with the output of decimating filter 182. These RISC arithmetic units 186 may assume tasks such as providing the vernier tuning of gain adjusted in a gross format at the conditioning stage 166.

DMMA 184, in effect, being a part of programming and data memory 154 responds to a conveyed instruction set emanating from central control unit 148 and, for example, introduced from microcontroller 136. This instruction set will have bit-defined codewords corresponding with the signal attributes of the analog signal 164 which the user desires. Thus, the systems engineer or scientist may evolve these codewords using high level language at microcontroller 136 to program the integrated circuit 130. As noted above, that programming will contain the capability of providing controls to stages 166, 172 and 178, as well as the DMMA 184 and RISC units 186. The output of decimating filter 178 at arrow 182 is in word form, as opposed to being a serial bitstream, and may be operated upon by a RISC unit 186 to derive the noted bit-defined information vector. At DMMA 184, the vector is compared with the bit-defined codewords and subjected to a match control input to identify a correspondence between the information vector and one or more of the codewords. DMMA 184 produces a digital result which is a digital word and is presented to an output. The digital result may be used as is in the digital regime or may then be converted to an analog output signal. Where the digital result itself is extracted, it is so operated upon by the central control unit 148 and submitted to the host interface port 134.

The digital result is shown being outputted to an analog return path by arrow 196 which is directed to an oversampling decoder stage represented at block 198. Oversampling decoder 198 responds to a decoder control asserted from the central control unit 148, as represented by arrow 200, to provide an expanded digital word sample result with supplemented with inter-word positions. This may be implemented, for example, with a programmable zero fill function, as well as with an up sampler function. The expanded digital word sample result then is directed, as represented at arrow 202 to an interpolating filter stage represented at block 204. Filter stage 204 performs under an interpolator control asserted from central control unit 148, as is represented at arrow 206. Stage 204 provides an interpolator output which is manifested as a digital word defining signal having interpolated sample data values at supplemental inter-word positions produced at the oversampling decoder stage 198. An interpolating filter that is programmable is described, for example, in U.S. Pat. No. 5,457,456 (supra). The output signal now is ready for conversion to analog form and thus, as represented by arrow 208 and analog signal formation block 210. Conversion is under an analog control asserted from central control unit 148, as represented by arrow 212. The analog output signal then is directed as represented by arrow 214 to output interface stages as represented at block 216. Interface stages 216 will include a multiplexing function and are under the control of an output conditioning signal asserted from central control unit 148 as represented by arrow 218. The stages 216 will include variable drivers which function to apply some select electrical parameter drive value to the analog output signal such that it can be used in conjunction with a desired output device for actuation or drive purposes. Accordingly, this analog output is a treated analog output as represented at arrow 220 and symbol 222.

Figure 5:
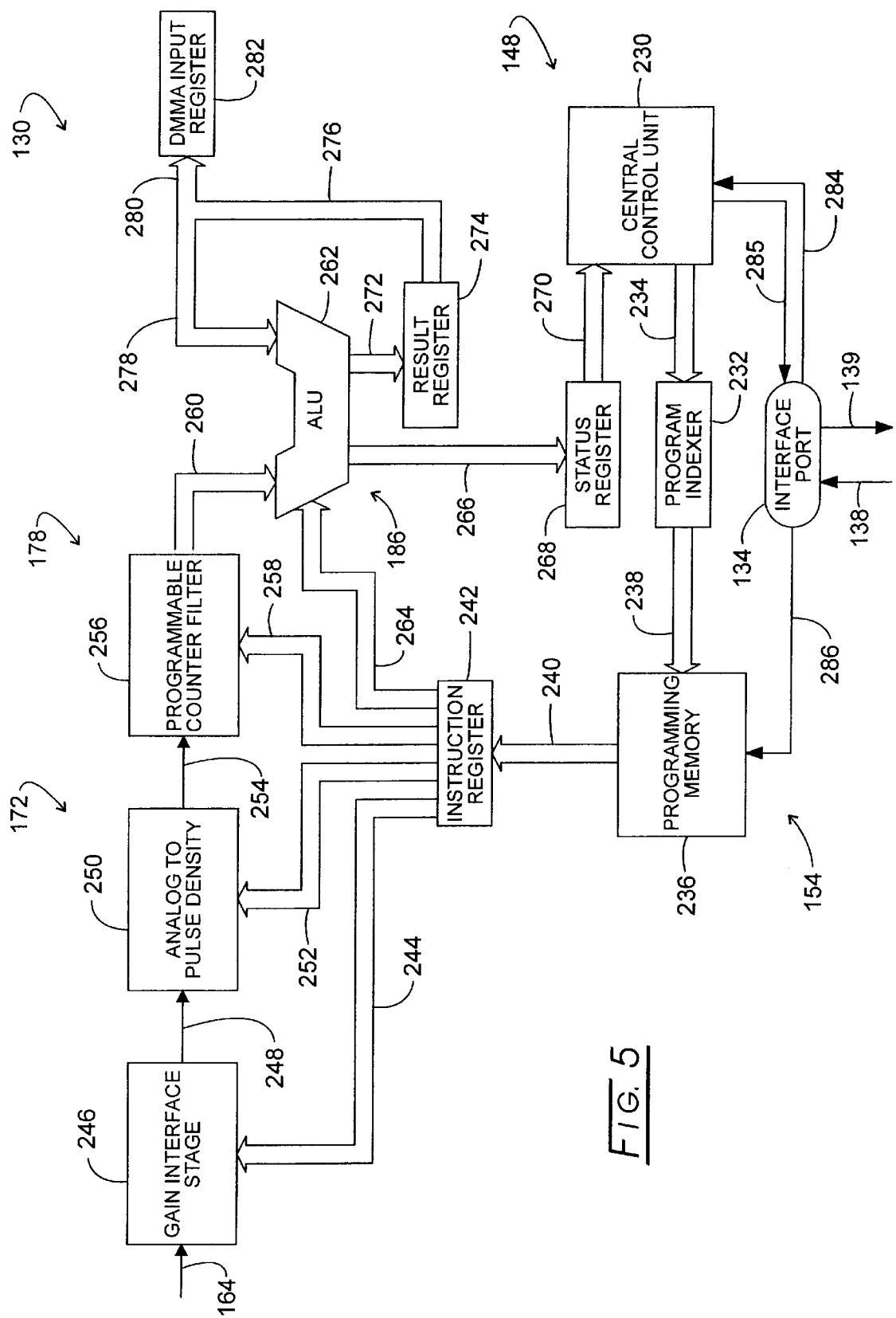
FIG. 5 is a schematic block diagram of the analog input path of the circuit of FIG. 4.

Referring to FIG. 5, the data path extending from the analog in terminal as represented at arrow 164 in FIG. 4 to the DMMA 184 is revealed at an enhanced level of detail. In the figure, the central control unit is represented in general at 148. However, this control feature incorporates register and indexer functions. Accordingly, the central control unit associated with those functions is represented at block 230. The control representative block 230 performs in conjunction with a program indexer as indicated by block 232 and bus 234. Indexer 232 performs the function of delivering sequential address instructions to the programming memory, now represented at block 236. These instructions are seen delivered via a bus 238. The instructions developed from the programming memory 236 essentially set switches and the like in the data path and delivery of such instructions is represented by bus 240 performing in conjunction with an instruction register 242. Thus, the conditioning signal output of the instruction register 242 is seen directed via bus 244 to the gain interface stage 246. Analog signal line 164 reappears in the figure being directed to input of stage 246 and the output of that stage is shown at arrow 248. Arrow 248 is directed to the earlier described oversampling coder which is now represented generally at 172. This function is implemented by an analog to pulse density component represented at block 250. As before, stage 250 performs in conjunction with an oversampling control as asserted via bus 252 from the register 242. The single bit stream output of component 250 is present at line 254 which is directed to the input of a programmable counter filter represented at block 256. The counter filter function of block 256 responds to a decimating filter control asserted via bus 258 and represents the implementation of the decimating filter stage 178. Counter filter 256 converts the pulse density characterized bitstream to word form and provides an output at bus 260 which, in a preferred arrangement, is directed to an earlier discussed RISC arithmetic unit represented generally in the instant figure at 186 and seem to be implemented by an arithmetic logic unit (ALU) 262. Arithmetic control to the ALU 262 is provided from bus 264 and the instruction register 242. It is desirable that the instantaneous operational status of ALU 262 be made available to the central control unit. Accordingly, a status register is provided as represented at bus 266 and block 268 which conveys such status information to the central control unit as represented at bus 270. The status register 268 will monitor such phenomena as an overflow, negative operations and the like. For some operations, it also is valuable to incorporate a result register with the output of ALU 262. Accordingly, as represented at bus 272 and block 274 a result register is provided, the output which is seen to be coupled in feed back loop fashion with an input of ALU 262 as represented at bus components 276 and 278. Additionally, as represented at bus component 280 the bit-defined information vector resulting either from the activity of the counter filter 256 itself or as additionally initially acted upon by ALU 262 is directed to a distributed memory matching array (DMMA) input register represented at block 282.

Interface port 134 reappears in the figure in conjunction with interactive lines 138 and 139. This port is seen to communicate with central control unit 230 as represented at arrows 284 and 285. Its association with programming memory component 236 is represented at arrow 286. Arithmetic logic unit 262 contributes a substantial amount of programming flexibility to the circuit 130. For example, such operations as rotating to the right or rotating to the left can be carried out to provide a simplified multiplication or division. As is apparent, incorporation of such components with the circuit 130 enhances the broad programmability of the circuit. While the analog to pulse density function block 250 contributes quantification noise, that noise and noise otherwise introduced into the circuit 130 commences to be filtered at programming counter filter 256. Additional noise removal is achieved at the DMMA discussed earlier at block 184 in FIG. 4.

Figure 6:
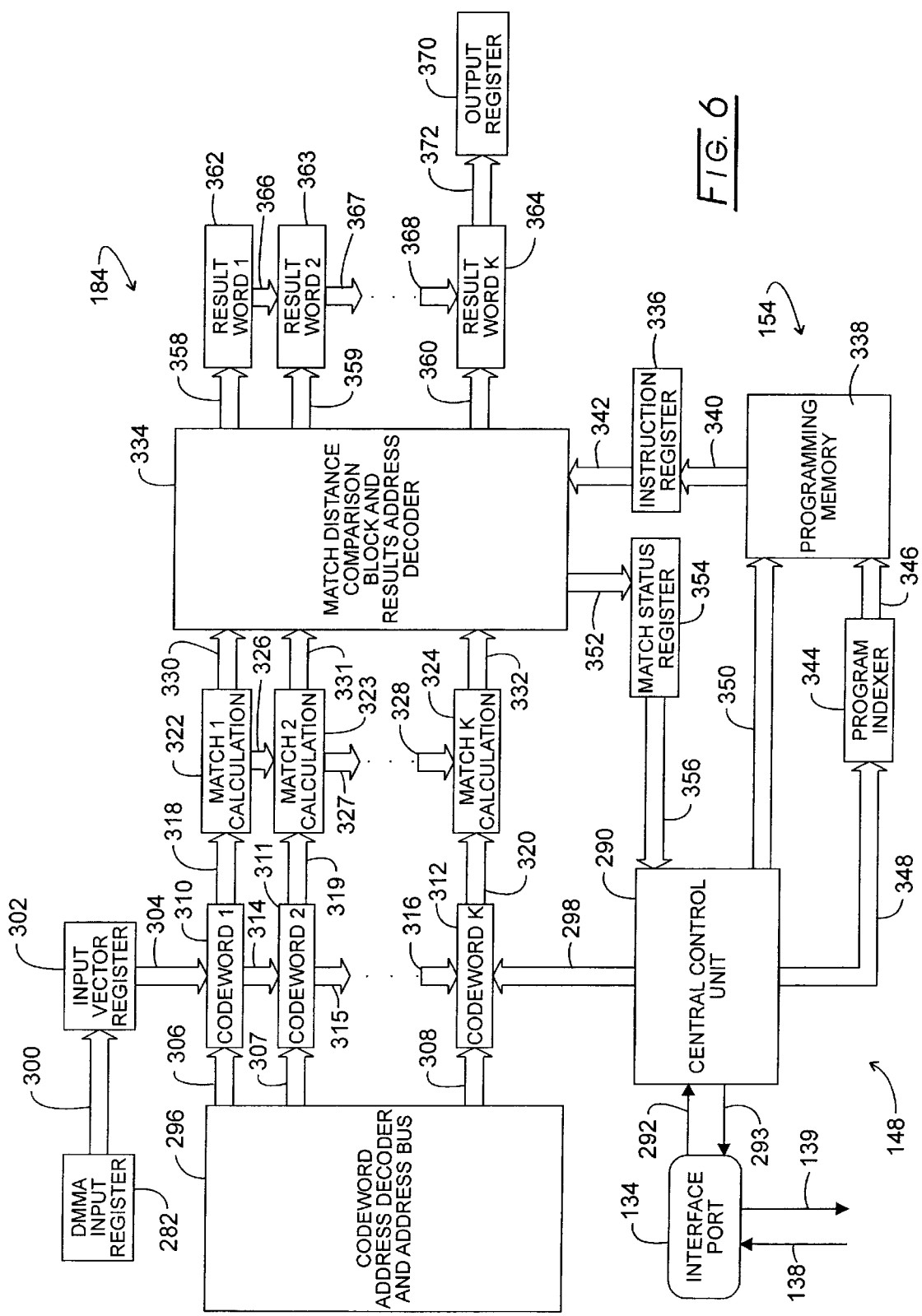
FIG. 6 is a block schematic diagram of a distributed memory matching array described in connection with FIG. 4.

Turning to FIG. 6, the DMMA 184 and its association with central control unit 148 is portrayed at an enhanced level of detail. Central control unit 148 is illustrated generally with that numeration and is shown additionally as a block 290 communicating with interface port 134 via arrows 292 and 293. Interface port 134 again is shown having an interactive capability with an outside component, as represented at interactive lines 138 and 139. Under the control of central control unit 290, a recognition operation is performed. In this regard, templates or codewords 1 through K are loaded from data memory via a codeword address decoder and address bus represented at block 296 in response to a codeword address input, as directed, for example, via a bus 298 emanating from central control unit 290. The bit-defined information vector now at DMMA input register 282 is directed, as represented at bus 300 and block 302 to an input vector register 302. Operating under a vector register control emanating from central control unit 290, the register 302 submits the information vector as represented at bus 304 for match comparison with a sequence of codewords identified as codewords 1 through K. Codewords 1 through K are conveyed instruction sets with bit-defined codewords corresponding with a desired analog signal attribute. Under a match control input from central control unit 290, each of the codewords will be compared or matched with the input vector submitted via bus 304. Thus, each codeword 1 through K is combined with the information vector in match calculation association within data memory. This activity is represented by bus components 306–308 extending to respective blocks 310–312. The sequencing of the match operation is represented by respective buses 314–316.

Each of the codewords 1 through K are compared in a match calculation with the input vector as represented by the bus grouping 318–320 performing in association with a match calculation represented by respective blocks 322–324. Sequencing for codewords 1–K is represented by bus components 326–328. The result of the matched calculation is a match distance value. These match distance values then are compared to find the most desired match, usually manifested as the smallest match distance value. Submittal of the match distances to this function is represented by bus grouping 330–332 in association with match distance comparison block and result address decoder 334. The match distance comparison circuit 334 is under a distance comparison control asserted from an instruction register represented at block 336. In this regard, the instruction register is shown coupled with programming memory 338 via bus 340 and in association with the match distance comparison circuit 334 via a bus 342. As before, programming memory 338 is sequenced from a program indexer represented at block 344 which is shown associated with memory 338 via bus 346 and with the central control unit 290 via bus 348. Association directly between central control unit 290 and programming memory 338 is represented at bus 350. The performance of the match distance comparison circuit of block 334 is monitored by the central control unit 290 as represented by bus 352, match status register 354 and bus 356.

The match distance comparison function carried out represented at block 334 will derive one or more digital result words representing a selected optimum matched distance. These result words are represented at bus components 358–360 and corresponding respective result word blocks 362–364. Sequential delivery of the result word is represented additionally at respective buses 366–368 and the result word is shown directed to an output register 370 as represented by bus 372. The output may be the codeword itself or some selected value associated with the input vector. Election of a codeword based on match distance is the nature of a promanatorial set of operations. A wide variety of approaches are available to the programmer for the election of optimum match distance. Where an exact match between the input vector and a codeword occurs, then generally it will be found desirable to flag that particular match.

The operation of DMMA 184 can be adaptive or non adaptive depending on the desire of the programmer. For example, should the match distance values tend to become unacceptable for match operations, then some alteration of the codeword set may be called for. This alteration of the instruction set can be adaptive in that some artficial intelligence can be incorporated within the system to provide a form of automated correction.

Figure 7:
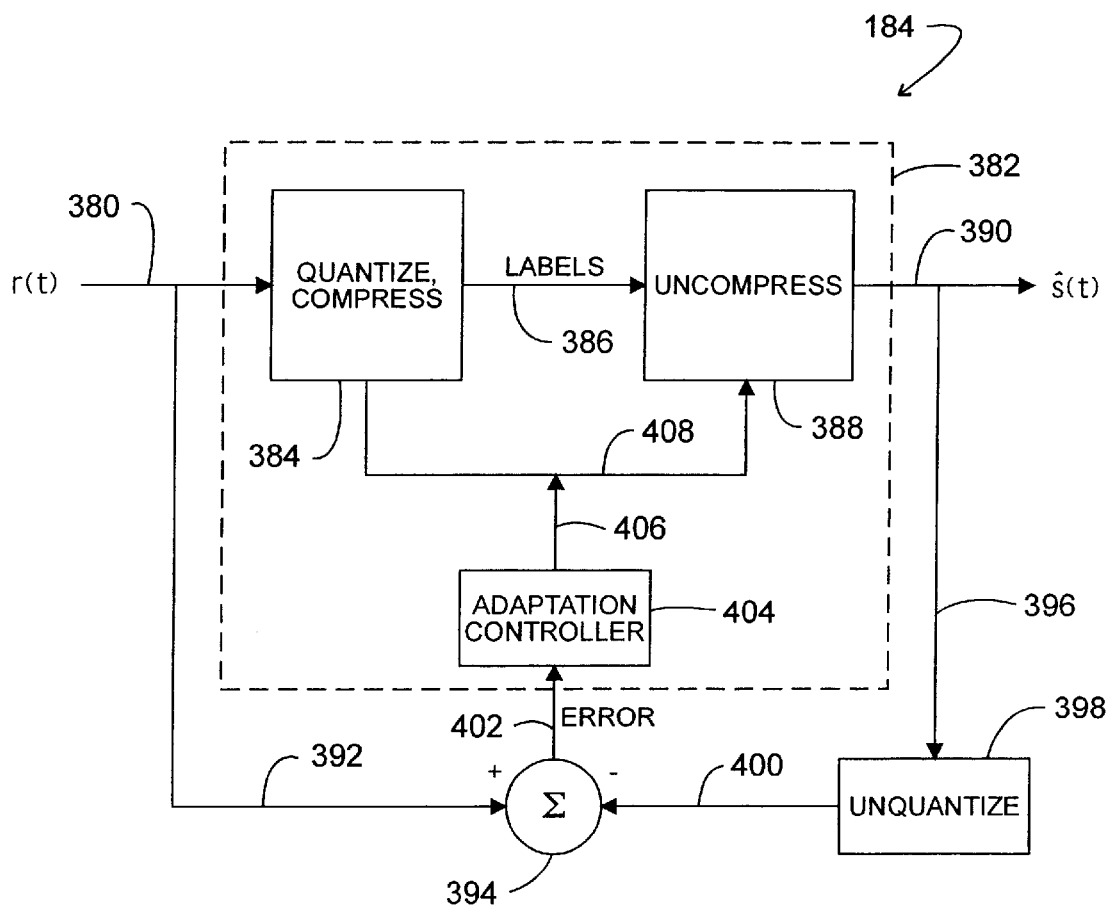
FIG. 7 is a behavioral description of the method of the invention.

Referring to FIG. 7, a behavioral description of the method is set forth. In general, a received signal r(t) will be submitted to the DMMA function 184. This received signal will develop a resultant signal component, s(t) and will be associated with some form of noise, n(t). Because the result is digital, it will only approach the analog value initially in the input signal. The received analog signal r(t) from a transducer as seen at arrow 380 is a precise electrical representation of a conglomeration of physical phenomena, one of which is usually the signal phenomenon of interest s(t), and the others are generally poorly understood. Arrow 380 introduces the analog signal to the system at hand as represented by dashed boundary 382. The signal processing needed to isolate the phenomenon of interest s(t) can become fairly complex and be ill-defined. The goal of the analog input/output circuit with the DMMA is to extract the desired signal from the extraneous phenomena also present. In many cases, the analog input/output circuits themselves can introduce extraneous phenomena into the signal processing, such as line power noise and component variations. Therefore, the received signal r(t) is transformed at a Quantize Compress Operation 384 into a number of different intermediate forms F1, F2, F3 . . . FN. Each of these intermediate forms evolved along the input data path contains the desired signal s(t) along with extraneous information. The use of intermediate forms enables the utilization of circuit components that minimize the corruption of the signal information in the analog domain, since many of the intermediate forms are transcribed in the digital domain. Such intermediate forms also allow for incorporating knowledge of the conglomeration of physical phenomena present at the transducer via codewords in the DMMA.

The intermediate forms, since they contain extraneous information, represent an amount of redundant information on the signal attributes. Therefore, as F1 is transformed to F2, there is a quantization and compression operation, and as F2 is transformed to F3, there is an uncompression operation. This compression operation removes the extraneous information, but also compresses the desired signal s(t), whereupon it is labeled as represented at arrow 386. An uncompression operation represented at block 388 recovers s(t), but since the uncompression operation is done in the digital domain, using the bits in the result words of the DMMA, the recovered signal is represented as ŝ(t), as seen at arrow 390.

Initially, the received signal contains the following signal attributes:

$$r(t)=x(t)+n(t) \quad (1)$$

Where n(t) represents random noise and other interfering phenomena. x(t) contains the desired signal s(t), but usually x(t) must be processed to extract s(t), as represented by the functional operation:

$$s(t)=\Phi[x(t)] \quad (2)$$

It is understood by those aquainted with the art of signal processing that a functional is a more complex operation than a function, mapping an entire function onto another function as opposed to mapping a specific sample point to a new sample point. Nevertheless, any processor works at the sample point level, so the received signal r(t) must be transformed to samples and then to the first intermediate form F1. The sample points are indexed by p, and the operation is as follows:

$$r(t) \rightarrow r(t=pT_s) \rightarrow r_p \rightarrow F1_p \quad (3)$$

Prior to being input to the DMMA, next intermediate form F2 is created and compared to codewords CW stored in the DMMA. The matching operation can use several distance measures, the Minkowski distance measure is shown below:

$$d(F2_p, CW_k) = \sum_{l=1}^{L} |F2_{p,l} - CW_{k,l}| \quad (4)$$

where L is the number of components in the codeword CW and hence also in the intermediate form F2. The DMMA assigns the intermediate forms F2 to various-regions in signal space, the regions designated as $R_k$, and the total number of regions are K. The intermediate for F2 that is closest to the codeword is assigned to that particular region m, as shown below:

$$d(F2_p, Cw_m) = \min \text{ (over all k)} d(F2_p, CW_k) \quad (5)$$

$$1 \leq k, m \leq K$$

$$R_m = \{F2_p : d(F2_p, CW_m) < d(F2_p, CW_k)\} \text{ over all } p, k \quad (6)$$

Each region $R_m$ is assigned a result word which is the intermediate form F3 that is sent to further processing on the analog output path. The codewords CW and the result words, are determined using an adaptation controller, which uses an algorithmic search technique to determine stored parameters such as codewords. In some cases, the codewords are determined from differentiation of an error measure with respect to a parametric description of the signal attributes.

The initial signal at line 380 may be directed to a summation function as represented at arrow 392 and symbol 394. The PCM form result at line 390 also may be submitted to summation, however, to equate the signal types, it will be unquantized as represented at arrow 396 and block 398 before being submitted to summation or error or generating function as represented at arrow 400. The resultant error signal is represented at arrow 402 being submitted to an adaptation controller 404 which then may alter the instruction set as represented by arrow 406 extending to arrow 408. Such an adaptive approach to control may be quite helpful, for example, where sensors are employed which tend to alter in their output as they age.

Figure 8:
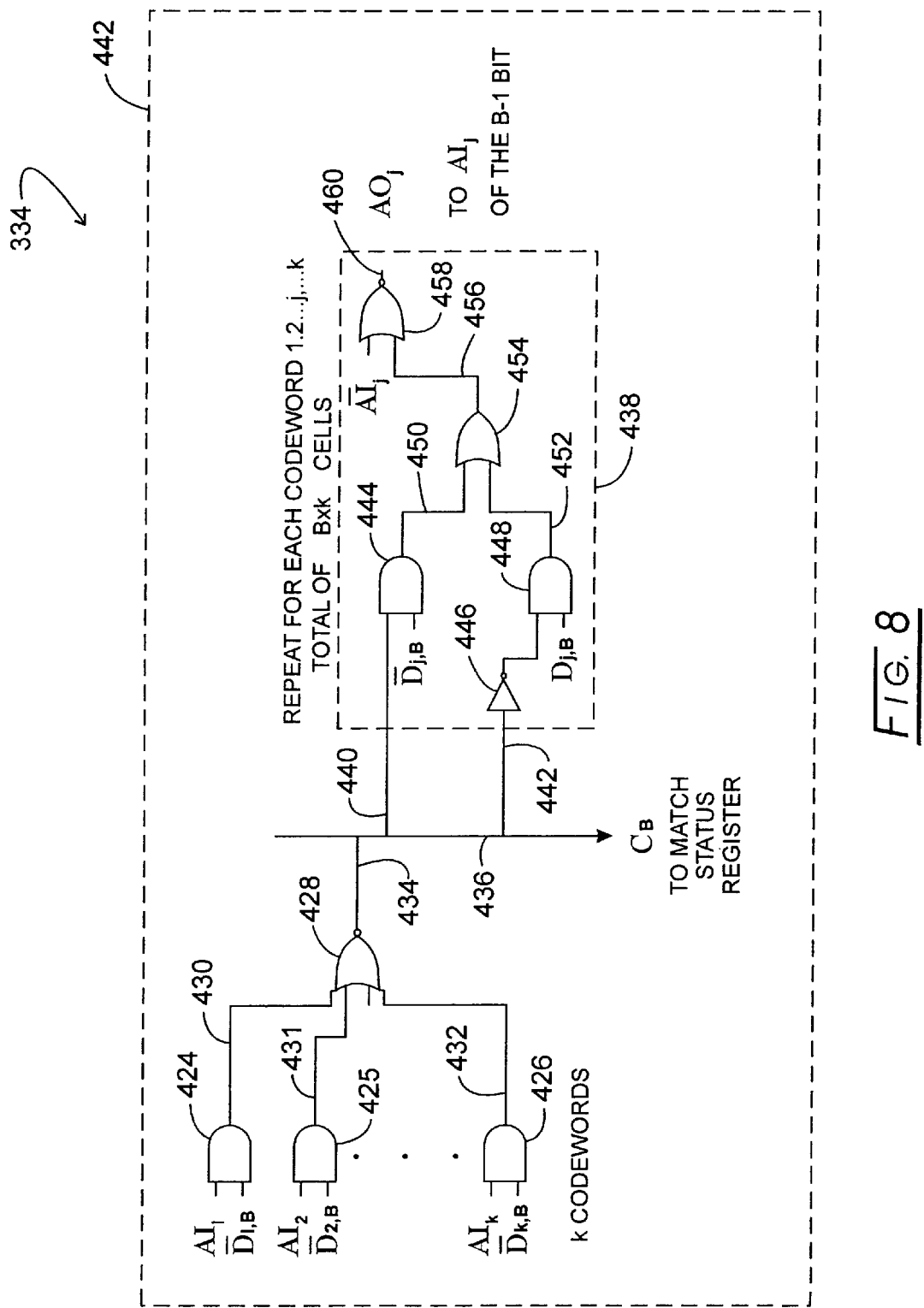
FIG. 8 is a logic diagram describing the operation of a match distance comparison circuit.

Referring to FIG. 8, one approach to determining an optimum match distance is schematically portrayed. Such match distance comparison technique is represented within a dashed boundary 422. The approach shown is one which is quite rapid, a desirable attribute for the type of integrated circuits at hand. In effect, the circuit looks at each bit position of a distance for each of K codewords. The approach moves from the most significant bit toward the least significant bit and where a zero value for an examined bit position is encountered, then the distance associated with that codeword is retained for further analysis. On the other hand, where a one value is determined to be present at such bit position, then the distance becomes a candidate to be dropped or eliminated. Before that can occur, it must be ascertained that a condition wherein all distances have a one at that bit location. In the representation, the complement of the distance, $\overline{D}_{1,B}$ is provided. In this arrangement, the distances are associated with 1–K codewords and the term B refers to bit position. Associated with the distances is a validation address, AI for 1–K codewords. That address accordingly identifies those codewords' linked distances which remain valid in the analysis. At the outset, all values for the address are ones. Accordingly, for each distance, the initial digit and its validation address is submitted to an AND function as represented by AND function symbols 424–426. The outputs of the AND functions are directed to a NOR function 428 as represented by output lines 430–432. With the logic, should the complement of the digit located for the most significant bit be a one or high logic level, then the output of NOR function 428 at line 434 will be low and draw a common compare line 436 low which provides an identification of the high distance value in a match status register. With the compare line being low, the system knows that a zero is present in at least one of the distances for the bit position at hand. It then carries out the logic represented within dashed boundary 438 for each codeword associated distance 1–K, that codeword j being under consideration with the symbology at hand. Logic block 438 represents an elimination process for each codeword associated distance. As drawn, it queries, does the jth codeword have a zero at the bit location? Where that is the case, then that distance remains a valid one for further bit consideration. If it does not have a zero at the bit location and one of the other match distances has a zero at that bit location, then the jth codeword would be dropped as invalid, its validation address being set to zero. Accordingly, with the logic at hand, a low value at compare line 436 is directed as represented by lines 440 and 442 to a logic system including AND function 444 and through an inverter function 446 to an AND function 448. The complement of the bit state for the jth codeword is directed to AND function 444, while the bit value itself is directed to AND function 448. The output of AND functions 444 and 448 are directed via respective lines 450 and 452 to an OR function 454 and the output thereof is directed to one side of a NOR function as represented by line 456 and symbol 458. An opposite input to the NOR function 458 is the complement of the validation address. Where the bit under consideration is indeed a zero, the output represented at line 460, AOj will remain having a valid address and the distance at hand will be maintained pending evaluation of the next bit, it being recalled that the system moves from the most significant bit toward the least significant bit. This process continues until a last remaining distance retains validity or a tie is at hand.

Figure 9:
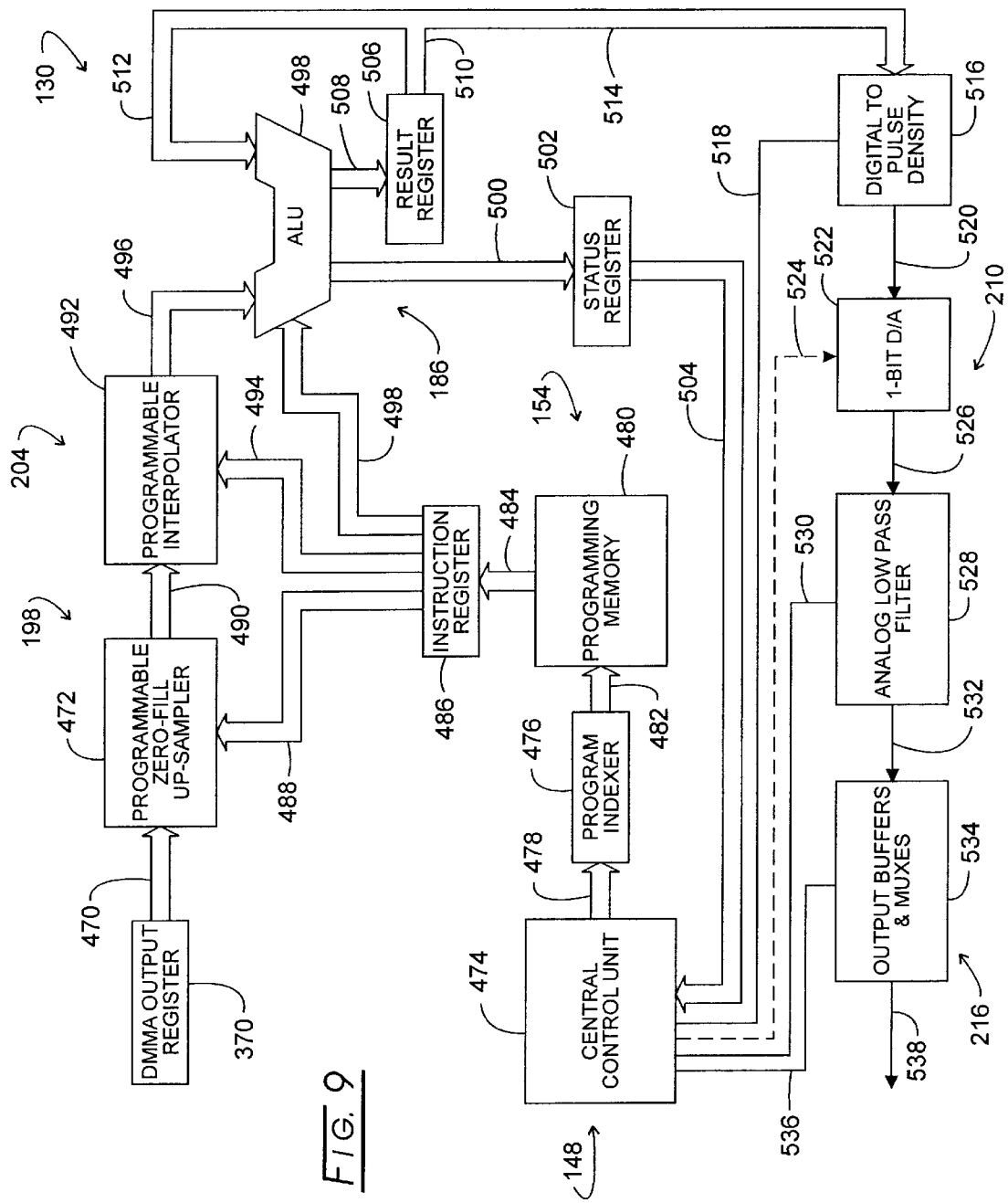
FIG. 9 is a block schematic diagram of an analog output path as described in general in connection with FIG. 4.

Referring to FIG. 9, the return path, wherein the digital result located in the DMMA output register 370 is portrayed at an enhanced level of detail. As noted earlier herein, the digital result can be taken in and of itself and utilized. Since the integrated circuit 130 is intended to be somewhat universal in nature, for some applications where an initial production product is at hand, there may be some value in using, in effect, one half of the circuit 130 until use experience with the system within which it is incorporated justifies the expenditure of a custom integrated circuit with a purely digital result. In FIG. 9, the DMMA output register 370 reappears with that numeration. The result word in that register is directed by bus 470 to a programmable zero-fill function and up-sampler represented at block 472. This function corresponds with the earlier noted oversampling decoder 198 which numeration is shown in general in conjunction with block 472. Programmable zero-fill stage derives an expanded digital word sample result by adding zero valuations at supplemented inter-word positions. The programmable zero-fill and up sampler function 472 performs in response to a decoder control provided under the direction of the central control unit represented generally at 148 and specifically herein at block 474. In this regard, the central control unit 474 is seen controlling a program indexer 476 as represented at bus 478. Program indexer 476 accesses instructions from programming memory 480 as represented by bus 482. Memory contained instructions then, as represented at bus 484 are directed to an instruction register 486. Register 486 may then apply the noted decoder control to the programmable fill and up sampler function at block 472 as represented by bus 488. A programmable zero-fill sampler is described, for example, in U.S. Pat. No. 5,463,569 by Staver et al, entitled: "Decimation Filter Using A Zero-Fill Circuit For Providing A Selectable Decimation Ratio", issued Oct. 31, 1995.

The expanded digital word sample result is directed, as represented by bus 490, to a programmable interpolator earlier described at 204 and now shown at block 492. Interpolator 492 performs under the control of the central control unit by an interpolator control instruction emanating from register 486 and delivered from bus 494. Interpolator 492 provides an interpolator output at bus 496 as a digital word defining signal having interpolated sample data values at the supplemental inter-word positions, i.e., the zero fill positions. It is beneficial to provide an RISC arithmetic function with respect to the expanded word at bus 496. Accordingly, the ALU function 130 again appears at 498 which operates under an arithmetic control provided from central control unit 474 and issued from the instruction register 486, as represented at bus 498. A RISC function also may be implemented here. ALU 498 is beneficial for providing additional arithmetic activities if called for, for example, shifts and the like. The operational status of ALU 498 is monitored by the central control unit 474 through the media of bus 500, status register 502 and bus 504. A digital word treated at ALU 498 is submitted to a result register 506, as represented at bus 508. It is beneficial to provide a feedback path from the result register to an input of ALU 498. In this regard, the output of register 506 is directed via bus components 510 and 512 to its input. Additionally, the result is directed via bus component 514 to the analog signal formation function described at block 210 in FIG. 4 and represented generally by that numeration in the instant figure. Bus component 514, carrying the interpolator output which may have been arithmetically treated at ALU 498, is directed to a digital to pulse density component represented at block 516. Stage 516 provides a serial bit stream signal having bit densities corresponding with the digital word-defining signal applied to it from bus 514. This stage 516 is under the control of central control unit 474, as represented by arrow 518. The pulse stream present at single line or arrow 520 then is directed to the input of a one-bit digital to analog converter stage represented at block 522. Stage 522 may be controlled from the central control unit 474, as represented by dashed arrow 524. A now nascent analog signal at arrow 526 is introduced to an analog low pass filter as represented at block 528. Low pass filter stage 528 is controlled from central control unit 474 as represented by line or arrow 530. There thus is provided an analog output signal at line or arrow 532 which is directed to a treatment stage including output buffers and multiplexes as is represented at block 534. Control over the stages 534 is from the central control unit 474, as represented by line or arrow 536. From stages 534, a treated analog output is provided as represented at arrow 538.

The circuit of the invention has been tested utilizing discrete components and associated computer simulation of the DMMA feature. Looking to FIG. 10, a basic input test signal without noise is represented. Note that the test signal is characterized in sharp triangular wave shapes. This characterization was utilized in developing codeword components for the DMM simulation.

Figure 10:
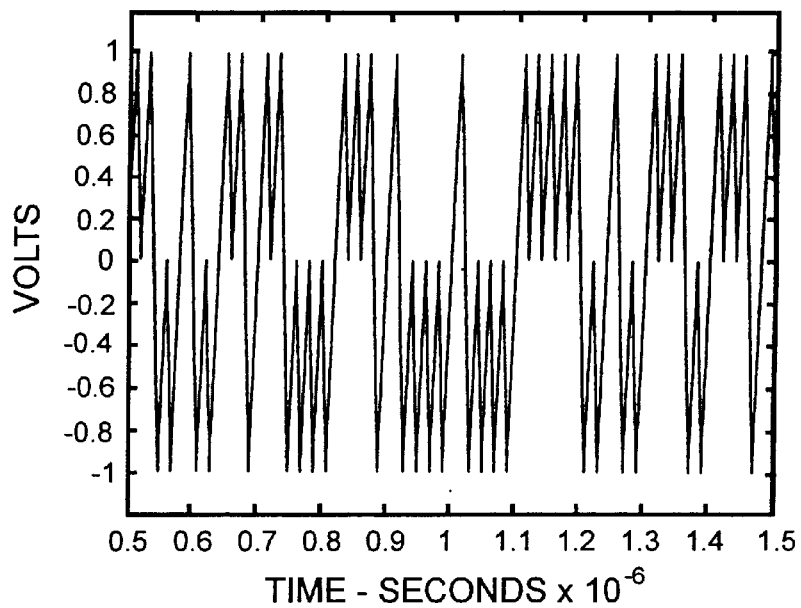
FIG. 10 is a test waveform utilized in testing a circuit according to the invention simulated in accordance with the invention.
Figure 11:
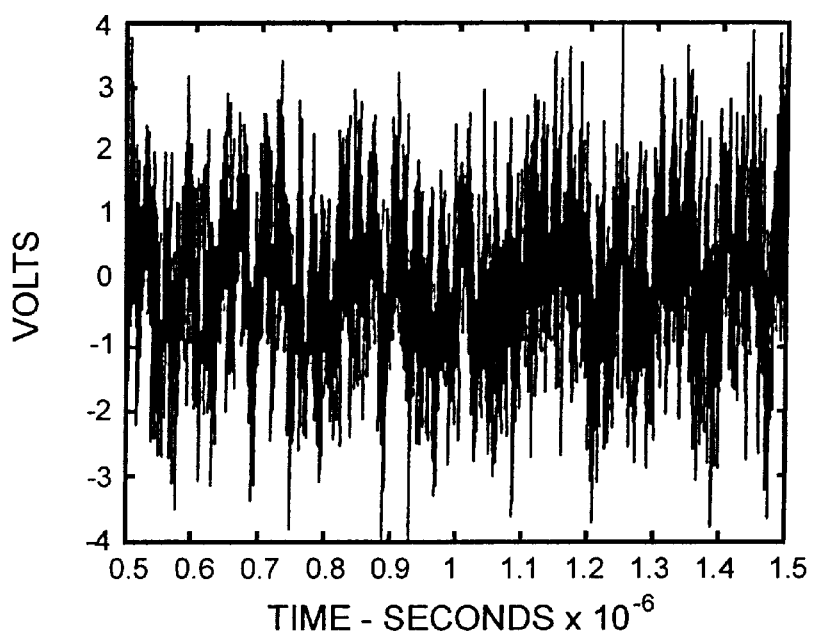
FIG. 11 is a waveform showing the waveform of FIG. 10 with the addition of random noise.

Next as revealed in FIG. 11, noise was added to the signal of FIG. 10 to develop a signal to noise ratio of −4.45 dB. This type of signal noise would be excessive for a conventional Sigma Delta oversampler as it is associated with subsequent digital filtering stages. In general, analog filtering would be required for such a conventional Sigma Delta treatment of this noisy signal.

Figure 12:
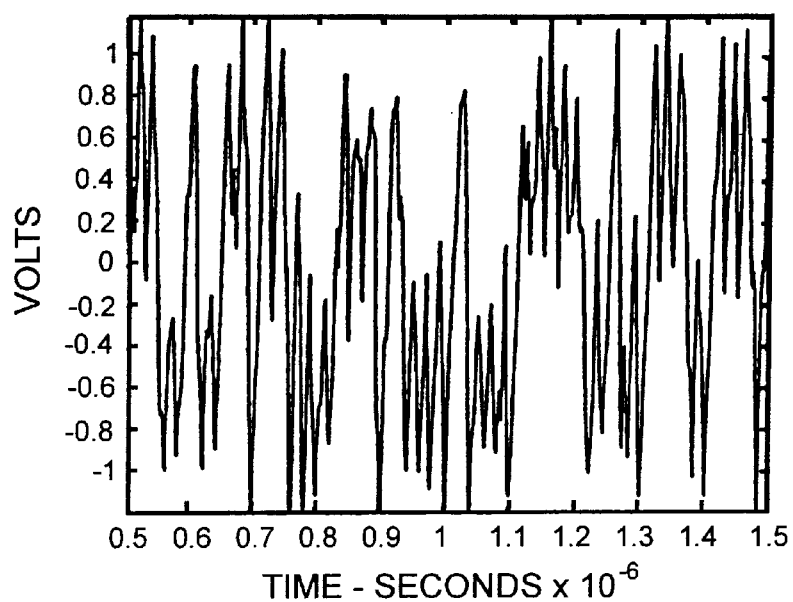
FIG. 12 is a waveform showing the results of subjecting the waveform of FIG. 11 to conventional Sigma Delta oversampling and subsequent digital filtering.

Looking to FIG. 12, the result of such a Sigma Delta oversamnpling and subsequent digital filtering is revealed to show substantial signal loss and a need for the noted analog front end filtering.

Figure 13:
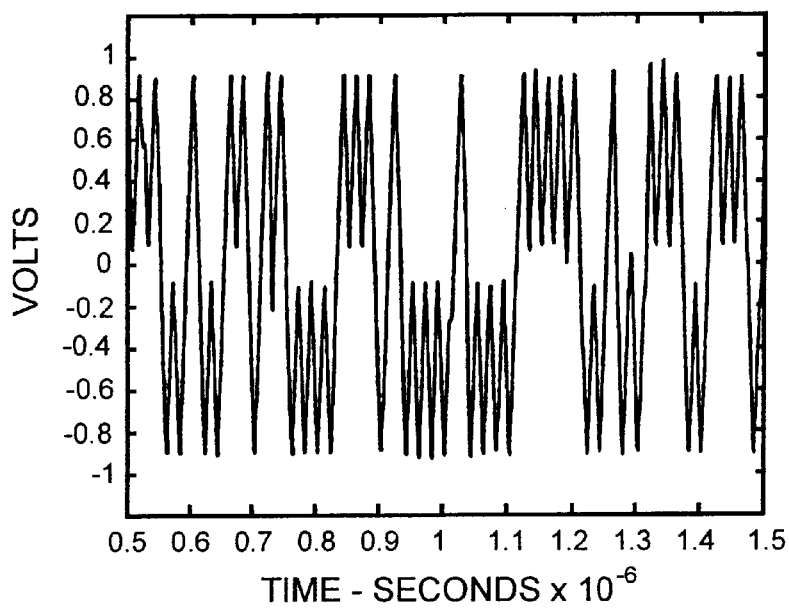
FIG. 13 is a waveform showing the waveform signal of FIG. 11 having been subjected to a bread boarded and computer simulated integrated circuit according to the invention.

Finally, FIG. 13 shows the result of using the DMM function with oversampling to recover desired attributes of the original input test signal of FIG. 10.

Since certain changes may be made in the above-described apparatus and method without departing from the scope of the invention herein involved, it is intended that all matter contained in the description thereof or shown in the accompanying drawings shall be interpreted as illustrative and not in a limiting sense.

What is claimed is:

1. An integrated circuit for receiving and treating an analog signal exhibiting given signal attributes and for communicating with an external control component, comprising:

a conditioning stage connectable to receive said analog signal to provide a conditioned analog signal;

an oversampling coder stage responsive to an oversampling control and to said conditioned analog signal to provide a corresponding coded serial bit stream output;

a decimating filter stage responsive to a decimating filter control and to said coded serial bit stream output to provide an output with a bit-defined information vector having a data aspect corresponding with said given signal attributes;

an interface port having a coupling portion connectable for communication with said external control component and an internal portion;

programming and data memory including a distributed memory matching array responsive to a conveyed instruction set having bit-defined codewords corresponding with a selected one of said signal attributes, responsive to a match control input to identify a correspondence between said information vector and at least one of said codewords to provide a digital result;

an output network responsive to said digital result to derive an output signal; and a central control unit coupled in data exchange relationship with said interface port internal portion and said programming and data memory and responsive to derive said oversampling control, said decimating filter control, said match control input, and to effect conveyance of said instruction set to said distributed memory matching array.

2. The integrated circuit of claim 1 in which:

said input conditioning stage includes a variable gain stage responsive to a conditioning signal to apply a select gain to said analog signal; and said central control unit is responsive to derive said conditioning signal.

3. The integrated circuit of claim 1 including:

an arithmetic unit having an arithmetic unit input responsive to said decimating filter output and to an arithmetic unit control to provide said information vector; and said central control unit is responsive to derive said arithmetic unit control.

4. The integrated circuit of claim 1 in which:
said oversampling coder stage is responsive to said conditioned analog signal to provide said coded serial bit stream output as a pulse density output; and
said decimating filter stage is a programmable counter filter.

5. The integrated circuit of claim 1 in which said central control unit includes a program indexer sequentially actuable to access said programming memory for said oversampling control and said decimating filter control, and an instruction register for applying said accessed oversampling control and said decimating filter control respectively to said oversampling coder stage and said decimating filter stage.

6. An integrated circuit of claim 1 including:
an arithmetic logic unit having an arithmetic unit input and an arithmetic unit output, responsive to said decimating filter stage output and an arithmetic unit control input to arithmetically treat said decimating filter stage output and provide said bit-defined information vector at said arithmetic unit output; and
said central control unit is responsive to derive said arithmetic unit control input for application to said arithmetic unit input.

7. The integrated circuit of claim 1 including:
an arithmetic logic unit having an arithmetic unit input and an arithmetic unit output, responsive to said decimating filter stage output and an arithmetic unit control input to arithmetically treat said decimating filter stage output and provide said bit-defined information vector at said arithmetic unit output; and
said central control unit includes a program indexer actuable to access said programming memory for said oversampling control, said decimating filter control and said arithmetic unit control input, and an instruction register for applying said accessed oversampling control and said decimating filter control respectively to said oversampling coder stage and said decimating filter stage and for applying said arithmetic unit control input to said arithmetic unit input.

8. The integrated circuit of claim 7 in which said arithmetic logic unit includes:
an arithmetic status register coupled with said arithmetic unit output and said central control unit for conveying instantaneous operational status data thereto; and
a result register coupled with said arithmetic unit output and in feedback relationship with said arithmetic unit input and further coupled with said distributed memory matching array for conveying said bit-defined information vector thereto.

9. The integrated circuit of claim 1 in which said distributed memory matching array comprises:
a codeword address decoder and address bus responsive to a codeword address input for accessing said codewords from said data memory;
an input vector register responsive to said bit-defined information vector and a vector register control for combining said information vector and said accessed codewords in match calculation association within data memory and having match distance values in response to a match calculation instruction;
a match distance comparison circuit responsive to said match distance values to provide said digital result; and
said central control unit is responsive to effect provision of said codeword address input, and said vector register control and to effect application of said match distance values to said match distance comparison circuit.

10. The integrated circuit of claim 9 in which said match distance comparison circuit is responsive to said match distance values to provide said digital result as one of said codewords.

11. The integrated circuit of claim 9 in which:
said central control unit includes a match distance program indexer actuable to access said programming memory for said distance comparison control; and
an instruction register coupled with said match distance comparison circuit for conveying said distance comparison control thereto.

12. The integrated circuit of claim 11 in which:
said match distance comparison circuit includes a match status register coupled with said central control unit for conveying instantaneous operational status data thereto.

13. The integrated circuit of claim 1 in which said output network comprises:
an oversampling decoder stage responsive to a decoder control and to said digital result to provide an expanded digital word sample result with supplemented inter-word positions;
an interpolating filter stage responsive to an interpolator control and to said expanded digital word sample result to provide an interpolator output which provides a digital word defining signal having interpolated sample data values at said supplemental inter-word positions;
an analog signal formation stage responsive to said interpolator output to provide a corresponding analog output signal;
an output interface stage responsive to said analog output signal for providing a treated analog output; and
said central control unit is responsive to provide said decoder control and said interpolator control.

14. The integrated circuit of claim 13 including:
a reduced instruction set arithmetic unit having an input responsive to said interpolator output and to an arithmetic control to provide said digital word defining signal; and
said central control unit is responsive to derive said arithmetic control.

15. The integrated circuit of claim 13 in which:
said output interface stage includes a variable drive circuit responsive to an output conditioning signal to apply a select electrical parameter drive value to said analog output signal; and
said central control unit is responsive to derive said output conditioning signal.

16. The integrated circuit of claim 13 in which:
said distributed memory matching array includes an output register for conveying said digital result;
said oversampling decoder stage comprises a programmable zero fill up register, and
said interpolating filter stage comprises a programmable interpolator.

17. The integrated circuit of claim 13 in which:
said central control unit includes a program indexer actuable to access said programming memory for said decoder control and said interpolator control, and an instruction register for applying said accessed decoder control and interpolator control respectively to said oversampling decoder stage and said interpolating filter stage.

18. The integrated circuit of claim 13 including:
an arithmetic logic unit having an arithmetic unit input and an arithmetic unit output, responsive to said interpolating filter stage interpolator output and an arithmetic unit control input to arithmetically treat said interpolator output and provide said digital word defining signal at said arithmetic unit output; and
said central control unit is responsive to derive said arithmetic unit control input for application to said arithmetic unit input.

19. The integrated circuit of claim 13 in which said analog signal formation stage comprises:
a digital to pulse density stage responsive to said interpolator output to provide a serial bit stream signal having bit densities corresponding with said digital word defining signal;
a one-bit digital to analog converter responsive to said serial bit stream signal to provide a nascent analog signal; and
an analog low pass filter responsive to said nascent analog signal to derive said analog output signal.

20. The integrated current of claim 13 in which said analog signal formation stage comprises:
a digital to pulse density stage responsive to said interpolator output and to a pulse density control to provide a serial bit stream signal having bit densities corresponding with said digital word defining signal;
a one-bit digital to analog converter responsive to said serial bit stream signal to provide a nascent analog signal;
an analog low pass filter responsive to said nascent analog signal and a filter control to derive said analog output signal; and
said central control unit in responsive to derive said pulse density control and said filter control.

21. The integrated circuit of claim 13 including:
an arithmetic logic unit having an arithmetic unit input and an arithmetic unit output, responsive to said interpolating filter stage interpolator output and an arithmetic unit control input to arithmetically treat said interpolator output and provide said digital word defining signal at said arithmetic unit output; and
said central control unit includes a program indexer actuable to access said programming memory for said decoder control, said interpolator control and said arithmetic unit control input, and an instruction register for applying said accessed decoder control and said interpolator control respectively to said oversampling decoder stage and said interpolating filter stage and for applying said arithmetic unit control input to said arithmetic unit input.

22. The integrated circuit of claim 21 in which said arithmetic logic unit includes:
an arithmetic status register coupled with said arithmetic unit output and said central control unit for conveying instantaneous operational status data thereto; and
a result register coupled with said arithmetic unit output and in feedback relationship with said arithmetic unit input and further coupled with said analog signal formation stage for conveying said digital word defining signal.

23. The integrated circuit of claim 13 in which said distributed memory matching array comprises:
a codeword address decoder and address bus responsive to a codeword address input for accessing said codewords from said data memory;
an input vector register responsive to said bit-defined information vector and a vector register control for combining said information vector and said accessed codewords in match calculation association within data memory and having match distance values in response to a match calculation instruction;
a match distance comparison circuit responsive to said match distance values to provide said digital result as one of said codewords; and
said central control unit is responsive to effect provision of said codeword address input and said vector register control and to effect application of said match distance values to said match distance comparison circuit.

24. An integrated circuit for receiving and treating an analog signal exhibiting given signal attributes and for communicating with an external control component, comprising:
an input network connectable to receive said analog signal to provide a network output with a bit-defined information vector having a data aspect corresponding with at least one of said given signal attributes;
an interface port having a coupling portion connectable for communication with said external control component and an internal portion;
programming and data memory including a distributed memory matching array responsive to a conveyed instruction set having bit-defined codewords corresponding with a selected said signal attribute, responsive to a match control input to identify a correspondence between said information vector and one of said codewords to provide a digital result;
an oversampling decoder stage responsive to a decoder control and to said digital result to provide an expanded digital word sample result with supplemented inter-word positions;
an interpolating filter stage responsive to an interpolator control and to said expanded digital word sample result to provide an interpolator output which provides a digital word defining signal having interpolated sample data values at said supplemental inter-word positions;
an analog signal formation stage responsive to said interpolator output to provide a corresponding analog output signal;
an output interface stage responsive to said analog output signal for providing a treated analog output; and
a central control unit coupled in data exchange relationship with said interface port internal portion and said programming and data memory to provide said decoder control and said interpolator control.

25. The integrated circuit of claim 24 including:
a reduced instruction set arithmetic unit having an input responsive to said interpolator output and to an arithmetic control to provide said digital word defining signal; and
said central control unit is responsive to derive said arithmetic control.

26. The integrated circuit of claim 24 in which:
said output interface stage includes a variable drive circuit responsive to an output conditioning signal to apply a select electrical parameter drive value to said analog output signal; and
said central control unit is responsive to derive said output conditioning signal.

27. The integrated circuit of claim 24 in which:
said distributed memory matching array includes an output register for conveying said digital result;

said oversampling decoder stage comprises a programmable zero fill up register, and said interpolating filter stage comprises a programmable interpolator.

28. The integrated circuit of claim 24 in which:

said central control unit includes a program indexer actuable to access said programming memory for said decoder control and said interpolator control, and an instruction register for applying said accessed decoder control and interpolator control respectively to said oversampling decoder stage and said interpolating filter stage.

29. The integrated circuit of claim 24 including:

an arithmetic logic unit having an arithmetic unit input and an arithmetic unit output, responsive to said interpolating filter stage interpolating output and an arithmetic unit control input to arithmetically treat said interpolator output and provide said digital word defining signal at said arithmetic unit output; and said control unit is responsive to derive said arithmetic unit control input for application to said arithmetic unit input.

30. The integrated circuit of claim 24 in which analog signal formation stage comprises:

a digital to pulse density stage responsive to said interpolator output to provide a serial bit stream signal having bit densities corresponding with said digital word defining signal:

a one-bit digital to analog converter responsive to said serial bit stream signal to provide a nascent analog signal; and an analog low pass filter responsive to said nascent analog signal to derive said analog output signal.

31. The integrated circuit of claim 24 including:

an arithmetic logic unit having an arithmetic unit input and an arithmetic unit output, responsive to said interpolating filter stage interpolator output and an arithmetic unit control input to arithmetically treat said interpolator output and provide said digital word defining signal at said arithmetic unit output; and said central control unit includes a program indexer actuable to access said programming memory for said decoder control, said interpolator control and said arithmetic unit control input, and an instruction register for applying said accessed decoder control and said interpolator control respectively to said oversampling decoder stage and said interpolating filter stage and for applying said arithmetic unit control input to said arithmetic unit input.

32. The integrated circuit of claim 31 in which said arithmetic logic unit includes:

an arithmetic status register coupled with said arithmetic unit output and said central control unit for conveying instantaneous operational status data thereto; and a result register coupled with said arithmetic unit output and in feedback relationship with said arithmetic unit input and further coupled with said analog signal formation stage for conveying said digital word defining signal.

33. The integrated circuit of claim 24 in which said distributed memory matching array comprises:

a codeword address decoder and address bus responsive to a codeword address input for accessing said codewords from said data memory;

an input vector register responsive to said bit-defined information vector and a vector register control for combining said information vector and said accessed codewords in match calculation association within data memory and having match distance values in response to a match calculation instruction;

a match distance comparison circuit responsive to said match distance values to provide said digital result as one of said codewords; and said central control unit is responsive to effect provision of said codeword address input and said vector register control and to effect application of said match distance values to said match distance comparison circuit.

34. A method for operating an integrated circuit to extract predetermined signal attributes from an analog signal applied to an input of said circuit, said method comprising the steps of:

conditioning said analog signal at an input conditioning stage to provide a conditioned analog signal;

oversampling said conditioned analog signal with an oversampling coder operating under an oversampling control to provide a coded serial bit stream output;

filtering said coded serial bit stream with a decimation filter operating under a decimation filter control to derive a bit-defined information vector having a data aspect corresponding with said predetermined signal attributes;

providing a programming and data memory including a distributed memory matching array responsive to an instruction set and to a match control;

providing said instruction set in said programming and data memory, said instruction set having bit-defined codewords corresponding with said predetermined signal attribute;

matching said information vector with each of such bit-defined codewords under said match control to identify a correspondence between said information vector and one of said codewords to provide a digital result;

deriving said oversampling control, said decimation filter control and said match control with a central control unit provided as a component of said integrated circuit; and generating an output signal corresponding with said digital result.

35. The method of claim 34 including the step of adjusting said information vector with a reduced instruction set computing arithmetic unit operating under an arithmetic control derived at said central control unit.

36. The method of claim 34 wherein said oversampling step codes said serial bit stream output by pulse density variation.

37. The method of claim 34 wherein said filtering step is carried out by applying said coded serial bit stream to a programmable counter filter.

38. The method of claim 34 in which said matching step is carried out by determining a match distance between said information vector and each said codeword, then selecting that codeword representing an optimum match distance as said digital result.

39. The method of claim 34 including the steps of:

comparing an unquantized signal corresponding with said digital result with said analog signal to derive an error value; and adjusting said instruction set utilizing said central control unit in correspondence with said error value.

40. The method of claim 34 in which said step of generating an output signal comprises the steps of:

expanding said digital result with supplemental inter-word positions in correspondence with a decoder control to provide an expanded digital word sample result;

providing an interpolated sample data value at each said supplemental inter-word position under an interpolation control to derive an expanded digital result;

generating said decoder control and said interpolation control with said central control unit; and converting said expanded digital result to an analog output signal.

41. The method of claim 40 including the step of adjusting said expanded digital result with a reduced instruction set computing arithmetic unit operating under an arithmetic control derived at said central control unit.

42. The method of claim 40 in which said step for converting said expanded digital result to an analog output signal comprises the steps of:

converting said expanded digital result to a serial bit stream having bit densities corresponding therewith;

converting said serial bit stream to a nascent analog signal;

applying said nascent analog signal to a low pass filter to derive an analog signal; and buffering said analog signal to derive said analog output signal.

* * * * *

UNITED STATES PATENT AND TRADEMARK OFFICE
CERTIFICATE OF CORRECTION

PATENT NO. : 6,202,198 B1  
DATED : March 13, 2001  
INVENTOR(S) : Steven B. Bibyk It is certified that error appears in the above-identified patent and that said Letters Patent is hereby corrected as shown below:

<u>Title page,</u>
Item [73], Assignee should read as follows:
-- The Ohio State University Research Foundation, Columbus, OH (US) --.

Signed and Sealed this

Thirtieth Day of October, 2001

Attest:

NICHOLAS P. GODICI  
*Attesting Officer*     *Acting Director of the United States Patent and Trademark Office*